United States Patent (10) Patent No.: US 7,577,943 B2
Chilimbi et al. (45) Date of Patent: *Aug. 18, 2009

(54) STATISTICAL MEMORY LEAK DETECTION

(75) Inventors: Trishul A Chilimbi, Seattle, WA (US);
Matthias M Hauswirth, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 828 days.

This patent is subject to a terminal disclaimer.

(21) Appl. No.: 10/892,260

(22) Filed: Jul. 15, 2004

(65) Prior Publication Data

US 2005/0091646 A1 Apr. 28, 2005

Related U.S. Application Data

(63) Continuation-in-part of application No. 10/693,834, filed on Oct. 24, 2003.

(51) Int. Cl.
*G06F 9/44* (2006.01)
*G06F 13/00* (2006.01)

(52) U.S. Cl. .................. 717/130; 711/159; 711/170

(58) Field of Classification Search .............. None
See application file for complete search history.

(56) References Cited

U.S. PATENT DOCUMENTS

| 6,560,773 | B1* | 5/2003 | Alexander et al. | 717/128 |
| 6,658,652 | B1* | 12/2003 | Alexander et al. | 717/128 |
| 7,032,217 | B2* | 4/2006 | Wu | 717/158 |
| 7,257,692 | B2* | 8/2007 | Schumacher | 711/170 |
| 7,293,142 | B1* | 11/2007 | Xu et al. | 711/124 |
| 7,293,263 | B2* | 11/2007 | Dahlstedt et al. | 717/154 |
| 7,313,661 | B1* | 12/2007 | Dmitriev | 711/159 |
| 2003/0061597 | A1* | 3/2003 | Curtis et al. | 717/128 |
| 2003/0163661 | A1* | 8/2003 | Marion et al. | 711/170 |
| 2004/0193662 | A1* | 9/2004 | Garthwaite | 707/206 |
| 2005/0114843 | A1* | 5/2005 | Gilgen et al. | 717/127 |
| 2005/0204342 | A1* | 9/2005 | Broussard | 717/124 |

* cited by examiner

*Primary Examiner*—Tuan Q Dam
*Assistant Examiner*—Hanh T Bui

(57) ABSTRACT

A method of detecting memory leaks. The method of detecting memory leaks comprises, adaptively bursty tracing a program execution to track accesses to heap objects with low overhead and using this information identify stale heap objects, which are reported as leaks.

20 Claims, 9 Drawing Sheets

Runtime Monitoring Software 980

STATISTICAL MEMORY LEAK DETECTION

CROSS REFERENCE TO RELATED APPLICATION

This application is a continuation in part of U.S. patent application Ser. No. 10/693,834 "Adaptive Instrumentation Runtime Monitoring and Analysis", filed Oct. 24, 2003. This application is related to co-pending application Ser. No. 10/305,056 "Dynamic Temporal Optimization Framework", filed Nov. 25, 2002 and published as Pub. No. US2004/0103401A1 on May 27, 2004.

TECHNICAL FIELD

The present invention relates to program instrumentation for run-time software monitoring and analysis.

BACKGROUND

Memory leak detectors play a key role in a number of applications that require protection against software errors, such as server applications, and the like. In a typical computer system, a memory leak detector might be used in a software development, or diagnostic system to find memory leaks.

Memory leaks give rise to inefficiencies in a computer system, and may cause system failure. Programmers often allocate and deallocate memory during the execution of a program. However, the allocation of memory is often inefficient, giving rise to memory leaks.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The Invention is a low overhead runtime memory leak detector. It finds even small leaks that manifest during program execution. The invention runs in the background as other applications run concurrently. Running the invention does not significantly slow down system performance due to its unique construction. The invention has low runtime overhead so it can be used to track leaks that take days to manifest without appreciably slowing down the execution speed of the program being examined. In particular the Invention identifies the memory heap allocations that leak memory, and exposes information regarding the last access to a memory leak data, which facilitates the process of debugging and fixing the memory leak.

Many of the attendant features of this invention will be more readily appreciated as the same becomes better understood by reference to the following detailed description considered in connection with the accompanying drawings.

DETAILED DESCRIPTION

The following description is directed to techniques and tools for bursty tracing with adaptive instrumentation for low-overhead, temporal profiling, which can be used in runtime monitoring and analysis of software. The techniques and tools can use a bursty tracing with adaptive instrumentation framework structured to comprise duplicate non-instrumented ("checking code") and instrumented code versions of at least some original procedures of the program.

Figure 1:
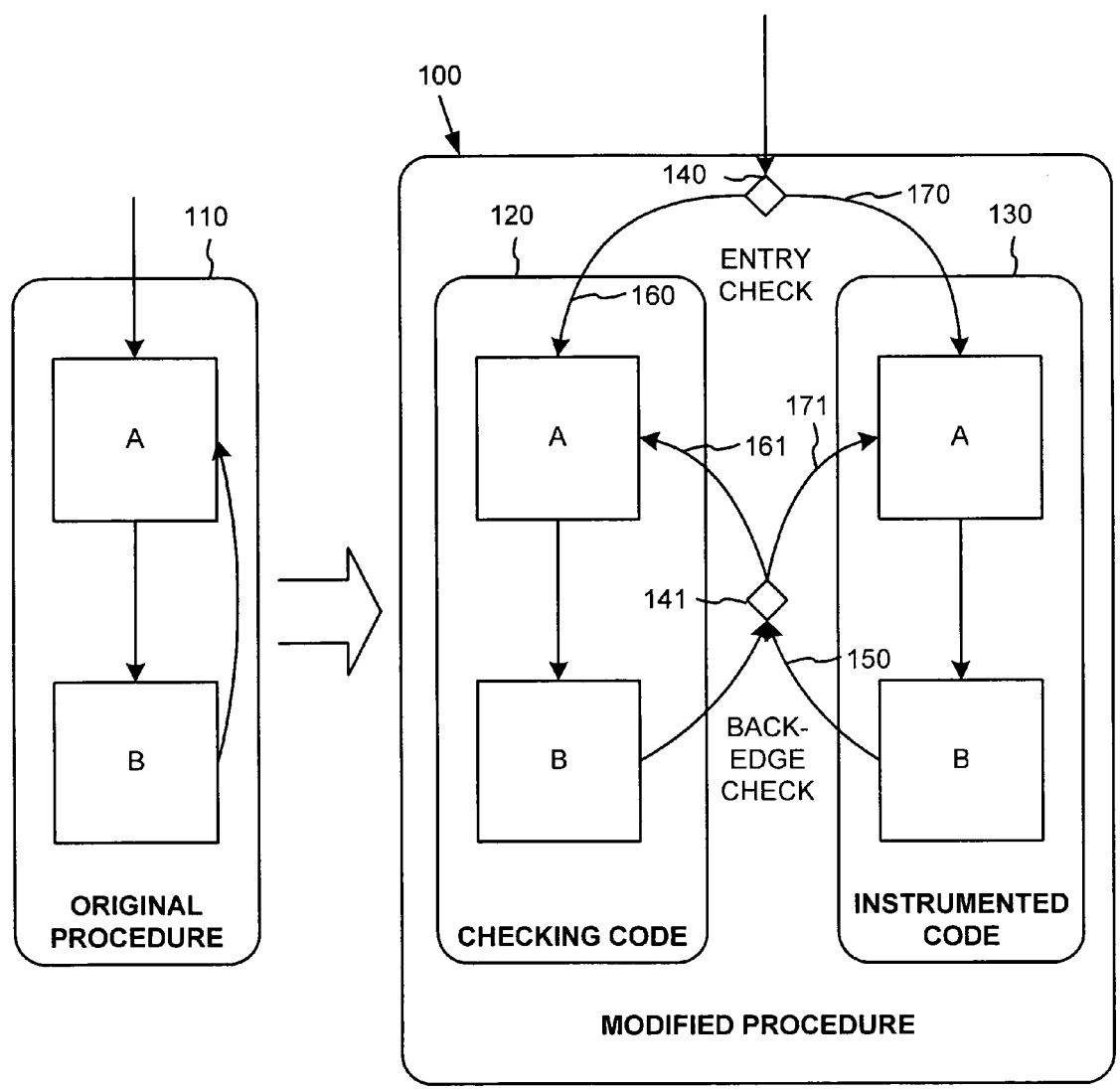
FIG. 1 is a block diagram of a program modified according to a bursty tracing framework.

A bursty tracing framework is described briefly in reference to FIG. 1. FIG. 1 is a block diagram of a program modified according to a bursty tracing framework 100. Original procedures 110 in the target software are duplicated such that a checking code (original code) 120 is produced along with an instrumented code 130. The instrumented code 130 can contain any number of instrumentation points. The framework 100 can comprise dispatch checks 140-141, which can be placed, for example, at procedure entry and loop back-edges. The dispatch checks are responsible for diverting control between the checking and instrumentation copies of the code based on counters relating to sample size (nInstr) and sampling period or rate (nCheck). Further details of the bursty tracing framework are provided in Trishul A. Chilimbi and Martin Hirzel, "Dynamic Temporal Optimization Framework," U.S. patent application Ser. No. 10/305,056, filed Nov. 25, 2003, which is hereby incorporated herein fully by reference.

While a bursty tracing framework captures temporal execution detail of frequently executed code paths, many program defects only manifest on rarely visited code regions that periodic bursty trace sampling alone is likely to miss. This shortcoming can be overcome by a variation of the bursty tracing framework that includes adaptive instrumentation, where a sampling rate at which bursty traces of the instrumented code are sampled is adapted to the frequency of execution of the respective code path.

In this bursty tracing with adaptive instrumentation, the framework maintains a per-dispatch check sampling rate rather than a global sampling rate. More specifically, a separate set of nCheck and nInstr counters are associated with each adaptive dispatch check. As in the bursty tracing framework, the nCheck counter for the adaptive dispatch check counts down a number of executions of the dispatch check that dispatch execution into the checking code. So long as the nCheck counter is non-zero, the dispatch check dispatches to the checking code 120. When the nCheck counter reaches zero, the nInstr counter is initialized to its initial value $nInstr_0$, and execution is dispatched into the instrumented version of the code 130. The nInstr counter counts down a number of executions dispatched to the instrumented code 130. When the nInstr counter again reaches zero, the nCheck counter is re-initialized to its initial value $nCheck_0$. The initial values $nCheck_0$ and $nInstr_0$ then determine the period between bursty trace samples and the length of the bursty trace, respectively. The sampling rate (r) is then given by $r=nInstr_0/(nCheck_0+nInstr_0)$.

In bursty tracing with adaptive instrumentation, this sampling rate is adapted to the frequency of execution of the code path through the adaptive dispatch check. The more often the code path (i.e., the adaptive dispatch check) is executed, the more the sampling rate is decreased. In one implementation, all adaptive dispatch checks initially produce bursty trace samples at a rate at or near 100% (full tracing). More specifically, the nCheck counter is initialized at $nCheck_0=0$, so that the first time the code path is executed a bursty trace is sampled through the code path. (As described above, if the nCheck counter is zero when the dispatch check is executed, then execution is dispatched to the instrumented code.) This provides a sampling rate of $r=nInstr_0/(0+nInstr_0)=1$ (which is 100% execution of the instrumented code).

On subsequent executions of the adaptive dispatch check, the counter nCheck that controls the sampling period is adapted to decrease the sampling rate. On subsequent resets of the nCheck counter, the sampling rate is decremented (by increasing the initialization value $nCheck_0$ of the nCheck counter at reset) towards a pre-set lower bound. In this fashion, rarely used code is sampled at very high rates, whereas more frequently executed code is sampled at or near a much lower sampling rate. In other words, the adaptive dispatch checks of rarely used code paths have high sample rates, whereas those of more frequently executed code are varied to lower sampling rates.

For adapting the sampling rates of the adaptive dispatch checks, the bursty tracing with adaptive instrumentation framework employs a further counter on the adaptive dispatch check and set of parameters, which includes a decrement, an interval, and a bound. This further counter controls when the sampling rate is decremented, and can be a count of the number of executions of the adaptive dispatch check in one implementation; or alternatively, a number of bursty traces sampled from the adaptive dispatch check (e.g., a number of nCheck counter resets), among other alternatives. The decrement determines how much to decrement the sampling rate (how much to increase the initialization value of the nCheck counter each time that it is reset). For example, in one implementation, the sampling rate is decremented by a factor of 10 each time the sampling rate is decreased, e.g., from 100%, 10%, 1%, 0.1%, etc. The interval determines how often to decrement the sampling rate. In one implementation, the sampling rate is decremented progressively less often. For example, the interval between decrements can be increased by a factor of 10 each time the sampling rate is decremented, e.g., from an interval of 10 nCheck counter resets, to 100, 1000, 10,000, etc. The bound counter determines the lower bound of the sampling rate for the adaptive dispatch check.

In one implementation, adaptation of the sampling rate is then performed when the nCheck counter is reset. In one implementation beginning with a 100% sampling rate, nCheck is initially set to zero, resulting in dispatching to the instrumented code to sample a bursty trace. On a subsequent execution of the adaptive dispatch check after the bursty trace completes, the nCheck counter is reset, after first adapting (possibly decrementing) the sampling rate.

In adapting the sampling rate, the interval counter determines the interval at which the sampling rate is decremented. The interval counter is incremented at each nCheck counter reset, and causes a decrement each time its count reaches a pre-set limit. This interval progressively increases. For example, in one implementation, the interval limit is increased by a factor of 10 each time it is reached (i.e., the interval limit is increased by interval limit=10*interval limit, each time it is reached), so that decrements are performed at nCheck reset counts of 10, 100, 1000, 10,000, etc.

At each decrement of the sampling rate, the initialization value ($nCheck_0$) of the nCheck counter is increased so as to effect the decrement in the sampling rate (r). In one implementation, the value of nCheck is varied according to the formula $nCheck_0(n)=(decr^{n-1}-1)*nInstr_0$, so $nCheck_0(1)=0$, $nCheck_0(2)=9*nInstr_0$, $nCheck_0(3)=99*nInstr_0$. With decr=10, then this formula yields: r(1)=100%, r(2)=10%, r(3)=1%. The decrement in the sampling rate continues until the lower bound of the sampling rate (e.g., 0.1% in one implementation) is reached.

For instance, in one embodiment, all dispatch checks can be sampled at a rate of 100% (i.e., full tracing) initially. Subsequent executions of the adaptive dispatch check then progressively reduce the sampling rate by an adjustable fractional amount until the adjustable or user-set lower bound sampling rate is reached. In the steady state, rarely executed code segments are virtually traced (sampled at close to 100%), while frequently executed code paths are sampled at the lower bound sampling rate. This approach trades the ability to distinguish frequently executed code paths from infrequently executed ones for more comprehensive code coverage.

The parameters of the adaptive dispatch checks can be adjusted in alternative implementations of the framework, so as to provide a different starting sampling rate, a different decrement size or factor, different interval of decrement progression, and a different lower bound, among others.

Figure 2:
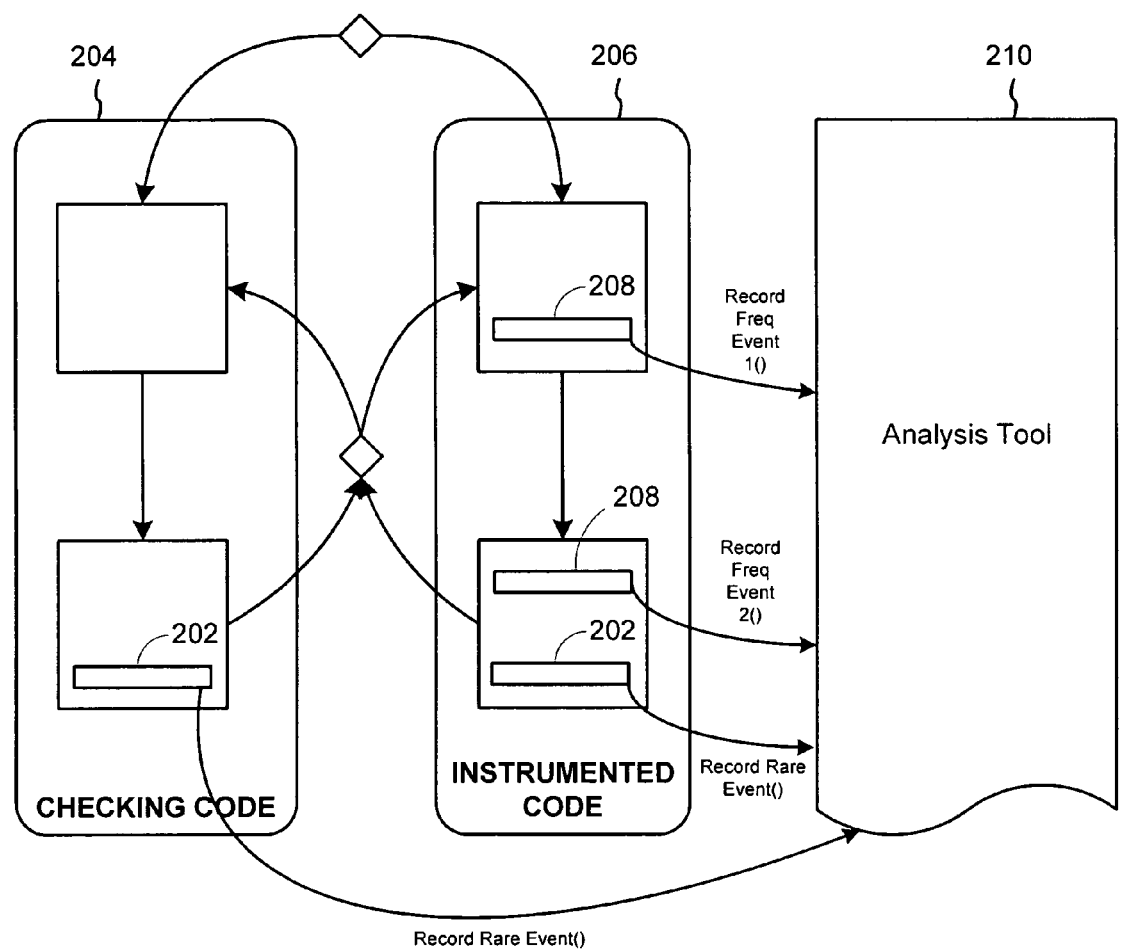
FIG. 2 is a framework for utilizing adaptive instrumentation in order to provide runtime monitoring and analysis.

Adaptive instrumentation can be used as a monitoring technique for plug-in tools that use the information to analyze the "correctness" of software, including but not limited to data races, memory leaks, and invariance. A framework for utilizing adaptive instrumentation in order to provide runtime monitoring and analysis is illustrated in FIG. 2. In one embodiment, infrequent program events, such as dynamic heap allocations and lock acquisitions, can be traced using conventional instrumentation. Such instrumentation 202 can therefore be placed directly into the checking code 204, as shown in FIG. 2, to provide runtime data on those events (Record Rare Event ( )).

Frequent events that are too expensive to trace, such as data references, branch executions, memory allocations, synchronization events (locks, barriers, critical sections, semaphores), load and stores, branches, etc., can be monitored using adaptive instrumentation or bursty tracing. These events can be monitored by adding instrumentation points 208 to the instrumented code 206 (Record Freq Event ½ ( )). The instrumentation points 208 can be added at custom locations in the instrumented code or at each of the previously mentioned events. Once instrumentation points 208 are provided, plug-in code can simply be provided at the instrumentation points that are executed at each of the monitored event occurrences to provide runtime data to an analysis tool 210.

In one embodiment, a memory leak detection tool is provided that uses the disclosed monitoring techniques to detect memory leaks if a heap object has not been accessed for a "long" time. This simple invariant ensures that the tool detects all leaks that manifest at runtime. However, there are two significant obstacles to implementing this staleness policy within a practical memory leak tool. First, the overhead of monitoring all heap data accesses can be prohibitive. Second, the leaks reported could include a large number of "false positives". Perhaps for these reasons, no existing memory leak tool uses this "staleness" approach.

The tool of the current embodiment addresses the first problem by using adaptive instrumentation or bursty tracing techniques to monitor heap accesses with low overhead. For instance, in this embodiment, the tool can use a lower bound sampling rate of 0.1%, which may entail a runtime overhead of less than 5% in some instances. Regarding "false positives," tuning the "time elapsed" before an unaccessed heap object is reported as a leak is sufficient to remedy this problem. In addition, many of the remaining false positives are of interest to developers since objects that have not been accessed for a very long time often indicate inefficient use of memory. Sampling the heap data accesses appears to have no noticeable impact on the number of false positives. This may be so because most heap objects are accessed multiple times and the sampling will have to miss all of these accesses for an active object to be mistakenly classified as a leak.

Figure 3:
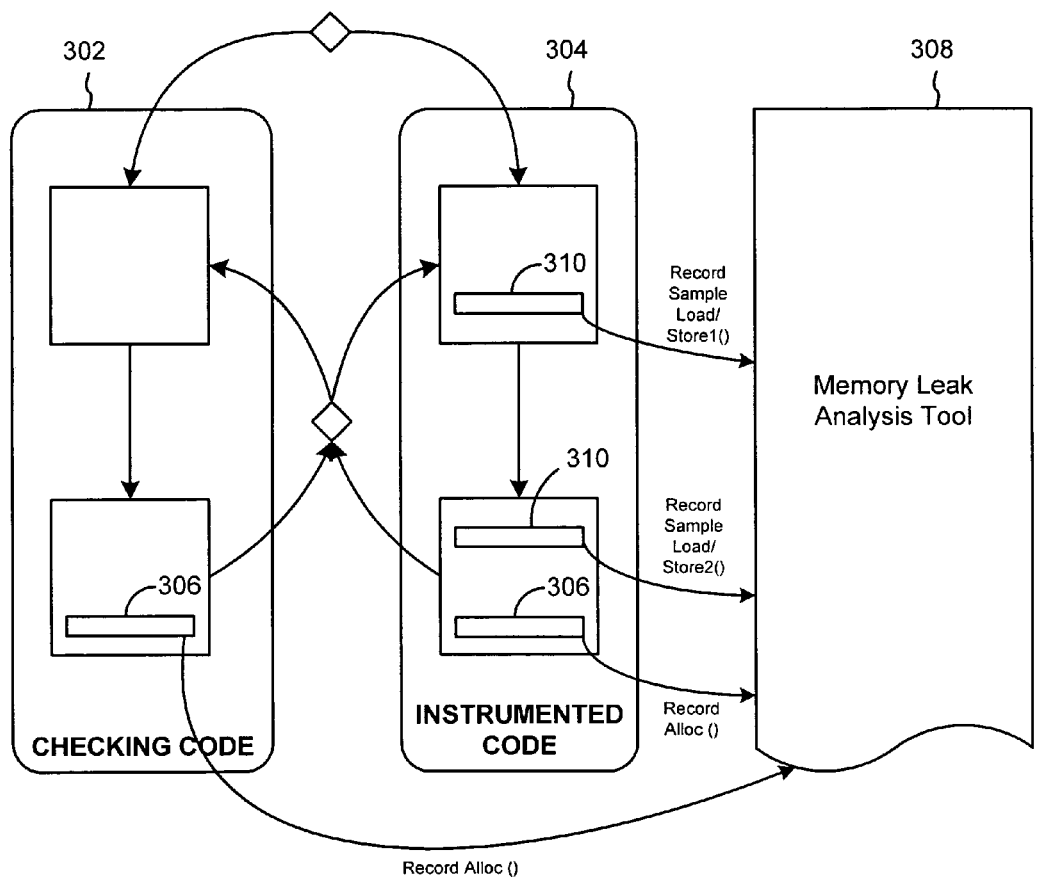
FIG. 3 is a block diagram of a memory leak detection tool implemented using the frame work of FIG. 2.

FIG. 3 is a block diagram of a memory leak detection tool implemented using the framework of FIG. 2. FIG. 3 shows checking code 302 and instrumented code 304. Checking code 302 includes instrumentation code 306 for providing information regarding memory heap allocations and frees to memory leak detection tool 308. Instrumentation code 306 includes instrumentation points where code can be inserted in order to provide event information. In this embodiment, the instrumentation points contain code 310 that provides sampled sets of heap accesses to memory leak detection tool 308.

Figure 4:
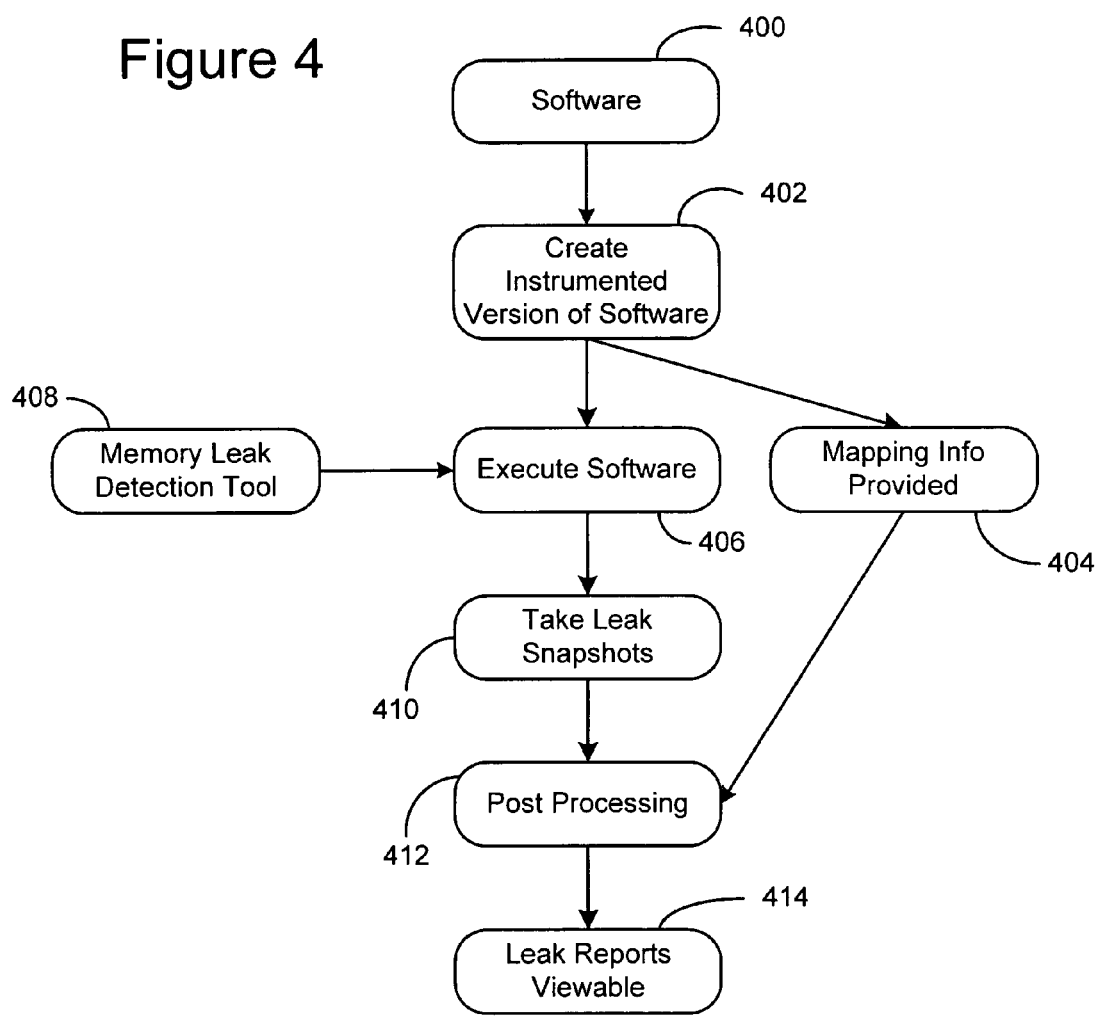
FIG. 4 shows a flowchart for one implementation of a memory leak detection tool.

FIG. 4 shows a flowchart for one implementation of a memory leak detection tool. An instrumented version of the software 400 is created at block 402. This instrumented version can be created using the adaptive instrumentation and bursty tracing techniques described previously. Additionally, mapping information 404, such as mapping a CPU instruction counter value at runtime to a line in source code, is also provided to facilitate "last access" information. The instrumented version is executed at block 406 in place of the original code along with a memory leak detection tool 408. The instrumented application can communicate event information, such as heap allocations and frees via instrumentation in the checked code, while a sampled set of heap accesses obtained via runtime monitoring using adaptive instrumentation or bursty tracing is provided to the memory leak detection tool 408 as previously described in FIG. 2.

The memory leak detection tool 408 uses the heap allocation and free information to maintain a model of the heap, which it updates with the heap access information. Periodically, the memory leak detection tool 408 takes a snapshot at block 410, where it visits all objects in its heap models and reports all objects that satisfy its staleness predicate as leaks. It is able to associate the responsible heap allocation, all heap frees that deallocated objects created at that allocation site, and most importantly the "last access", with each heap object reported as a leak. This last access information is invaluable for quickly debugging and fixing detected leaks. In addition, the last access information enables quick determination of "false positives". The leak snapshots are post processed at block 412 and leak reports can then be visualized through a user terminal at block 414. The user terminal can also include a source code browser that highlights a line of code in the program that is the last access to a leaked object.

Heap Model

The heap model keeps track of information about all allocated objects. The information maintained for an object is called an object descriptor. An object descriptor contains the object's start address, size, allocation site, allocation time, access count, first access time, last access time, and last access site. The heap model has to implement the following interface in order to maintain and provide access to this information:

---
AllocateObject(ip, startAddress, size)
FreeObject(ip, startAddress)
FindObject(ip, address)
GetObjectIterator( )

---

The instrumentations invoke the first two functions whenever an object is allocated or freed. Whenever AllocateObject is called, the heap model stores the allocation site (ip), allocation time, start address and size of the allocated object in its descriptor. The instrumentations of all the memory accessing instructions invoke the FindObject function. The address they provide to that function does not necessarily have to be the object's start address, but may point anywhere inside the object. The heap model updates the last access site (ip) and time each time FindObject is called. Since this function is invoked frequently, it should have minimal overhead. Finally, the GetObjectIterator provides a means to iterate over all currently allocated objects, retrieving all the available information for each object.

Alternative embodiments of this interface are possible. A first alternative embodiment which is the most straightforward would be an inline-implementation, where the object descriptor is maintained in the object's header. A key issue with this approach would be how to find the object's start address, given a pointer pointing inside the object.

Another alternative embodiment would be maintaining a hash table of each possible address to the descriptor of the object spanning the given address. This table would have one entry for each allocated object, a considerable space overhead.

A more advanced approach, and yet another alternative embodiment, would be to keep such a hash table for only the start addresses of each object, maintaining a separate compact data structure that maps from any address to the start address. Since objects usually are small, such a structure could encode the difference from an address to the corresponding object's start address in one or two bytes.

Figure 5:
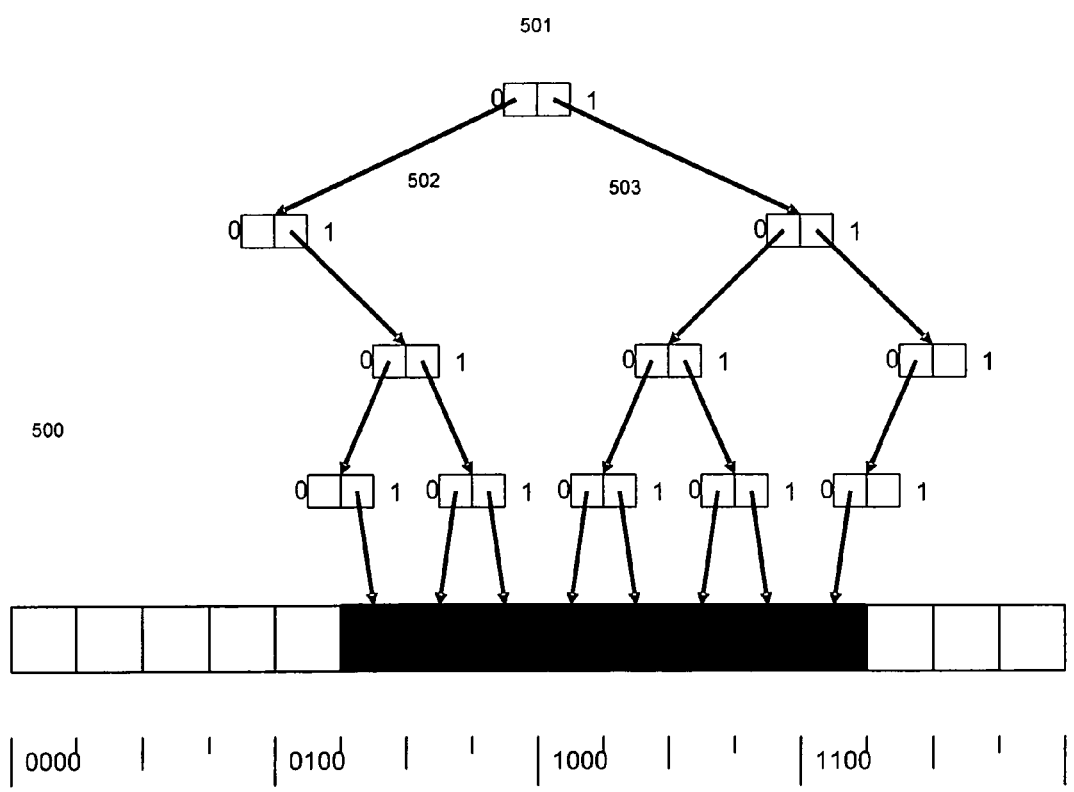
FIG. 5 is a diagram of an address tree.

FIG. 5 is a diagram of an address tree 500. The concrete implementation of the heap model uses a different approach. The embodiment of the invention maintains a binary tree structure called an address tree. Each level in this tree of depth 32 represents one bit in the 32 bits of an address. The root node 501 represents the most significant bit. Its two children 502, 503 represent the two sets of addresses where the first bit is 0 or 1 respectively. To find the descriptor for an object spanning a given address, the FindObject function starts at the root 501 of the tree and follows the path to the leaf describing the given address.

Figure 6:
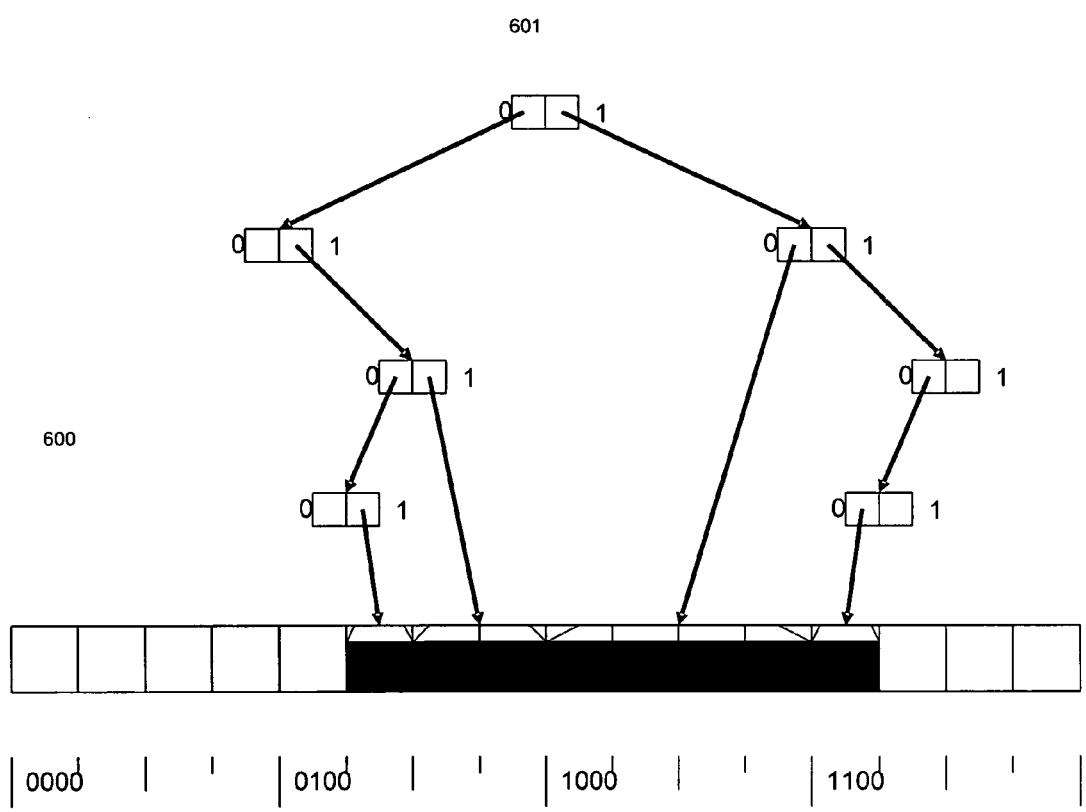
FIG. 6 is a diagram of an interior node whose addresses all reference the same object to directly point to the descriptor of that object.

FIG. 6 is a diagram of an interior node whose addresses all reference the same object to directly point to the descriptor of that object. Maintaining a complete binary tree with a leaf node for every used heap address would require a large amount of memory. To reduce this space overhead an interior node whose addresses all reference the same object to directly point to the descriptor of that object is allowed. This interior node eliminates a large amount of leaf nodes and their ancestors. The space savings are particularly big for large and for well aligned objects. Since allocators often align objects to 4 byte boundaries (and thus objects' start addresses and sizes often are a multiple of 4) essentially all nodes on the lowest two layers are saved. But in contrast to other approaches that might exploit the 4 byte object alignment, the approach is flexible and still works in the presence of unaligned objects.

The time overhead of the FindObject function is constant, given a 32 bit address and the resulting 32 bit address tree. In the worst case 32 address tree nodes are traversed to reach the object descriptor. Note that the top level of the address tree 601, and the most frequently traversed address tree nodes are likely to reside in the data cache, which keeps memory access costs down. In addition, a minimum sampling rate of 0.1% is used, which mitigates the impact of this operation on overall program execution time.

The space overhead of the address tree based heap model, has 0.03 to 0.25 bytes allocated for address tree nodes per byte allocated for the benchmark. Overall the heap model of the exemplary embodiment may consume 0.12 to 2.2 times the amount of application-allocated memory.

Staleness Predicate

Various staleness predicates can be utilized in embodiments of the invention, either alone or in combination. The following describes representative types of staleness predicates. A first kind of predicate, or measure, for staleness can be based upon the length of time until an object is accessed. A second type of predicate can also be based upon activity intervals based on the product of the time that has elapsed between a first and subsequent access to the object (c), and the length of time that the object is accessed (a). This activity interval (ca) provides additional information. A third predicate can be based upon memory that has been allocated, but never accessed. Other classes of staleness predicates are also possible.

The leak detector periodically traverses the heap model, trying to identify leaked objects. As described in the previous subsection, the heap model maintains information in the descriptor of each heap object. Given this information, a staleness predicate guesses whether the object is leaked or not.

Figure 7:
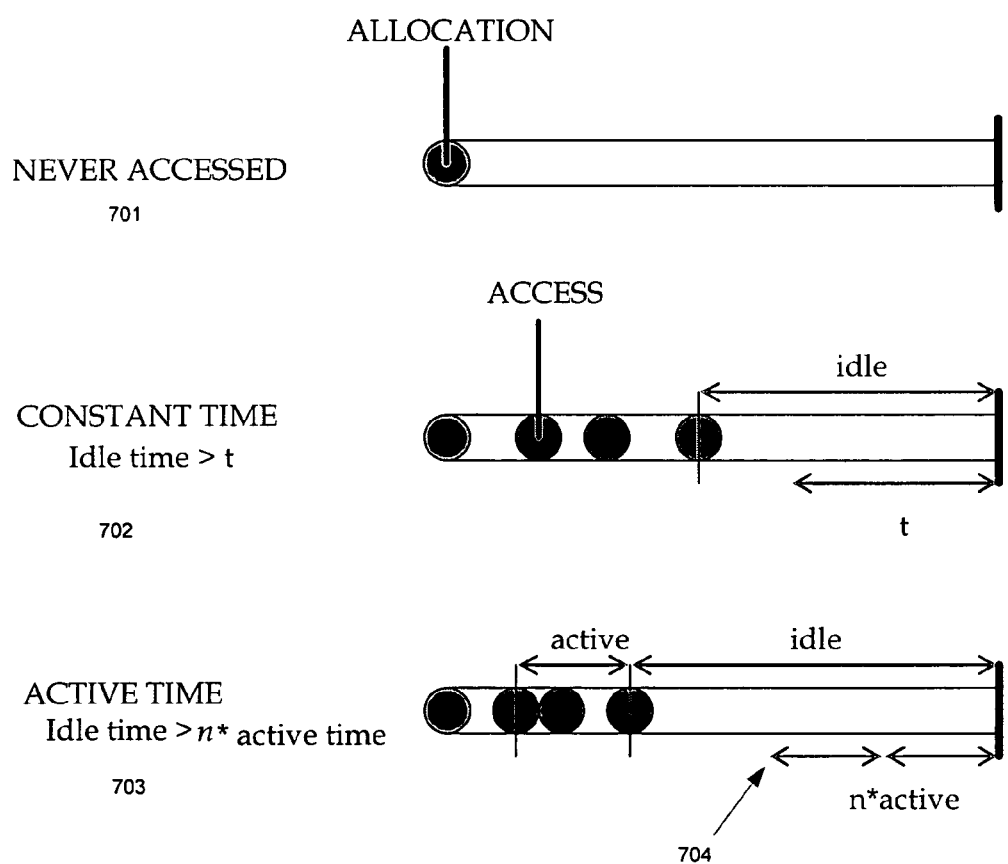
FIG. 7 gives an overview of three different staleness predicates.

FIG. 7 gives an overview of three exemplary staleness predicates. The Never Accessed staleness predicate 701 considers objects that have not been accessed a leak. The Constant Time staleness predicate 702 bases its guess on the length of time since the last access of an object. If that time is above a constant threshold the object is considered to be leaked. The Active Time predicate 703 is similar to the constant time predicate 702. The difference is that the threshold 704 is not a constant, but n times the active time of the object. The active time of an object is the time between its first and its last access so far. The intuition behind this predicate is that an object that has been active for a long time is allowed to be inactive for a long time, before it is considered a leak.

Identifying Leaks

A central question for any practical memory leak detector is what to report to the user. The running of the embodiment of the invention and application forms a report that is communicated to an embodiment of the invention's user interface tool, that produces a graphical report ("leak report").

What the detector actually detects are leaked objects. A leaked object is not the same as a leak, which is the "hole" through which the leaked object leaked. In a memory leak detector this hole is the missing deallocation site. Since that site is missing, a leak detector has no exact point in the source code it can identify as the actual leak.

Typical leak detectors may only report the allocation site of a leaked object. The statistical leak detector provides information with respect to where an object was leaked. Since object accesses are already sampled, and the last access for the leakedness prediction is kept track of, the last observed access site in addition to the allocation site for each leaked object can be reported. Furthermore the deallocation sites of objects that were allocated at the same allocation site where the leaked object was allocated are presented, if such deallocation sites exist. This can further narrow down the region of code where the leaked object should have been deallocated.

Ordering Leaks

Sometimes the leak detector reports an object as leaked even though it is still going to be accessed in the future. Thus the results of the detector contain false positives (objects wrongfully report as leaked). It aggressively classifies unused objects as leaked. This leads to the problem of false positives, which is addressed by prioritizing leaks in the reported leak list.

Indications of false positives can be useful. As those skilled in the art will appreciate since the false positives point out inefficient memory allocations. For example programmers often store information into memory anticipating that it will be needed later. If the embodiment of the invention shows that this information is not accessed then it is an inefficient allocation of memory.

There may be three different leak list sorting orders, by number of objects, by number of bytes, and by drag. A leak that leaks many objects probably is a true leak. The leak detector takes a statistical predictive approach to leak detection, and thus the probability for a leak to be a true leak increases with each additional object expected to be leaked by that leak. In addition, since many large leaked objects may usually cause a bigger problem than many small leaked objects, ordering by number of leaked bytes ranks the more problematic leaks higher. The true cost of a leak is not just how many bytes it leaked, but the space-time product of leaked bytes multiplied by the time the leaked objects used up space. This product is called the leak's drag. Ordering the leak list by drag, ranks the most expensive leaks at the top.

A data race detection tool can also be implemented using the framework of FIG. 2. A data race occurs when an object is accessed by two different threads without explicit synchronization, which can cause unexpected behavior typically not evidenced until quite some time down-stream in the execution path. A data race detection tool works by tracking lock acquisitions and releases and refining its model of which locks protect which shared data by keeping track of the locks held by threads that access shared variables. Each shared variable has a lock-set that is constantly refined by intersecting it with the locks held by the thread making the current access. If the intersection is null, the tool reports a race. The tool must incur a high runtime overhead because it has to track all data accesses. By implementing a tool using the framework of FIG. 2, this overhead can be significantly reduced.

Figure 8:
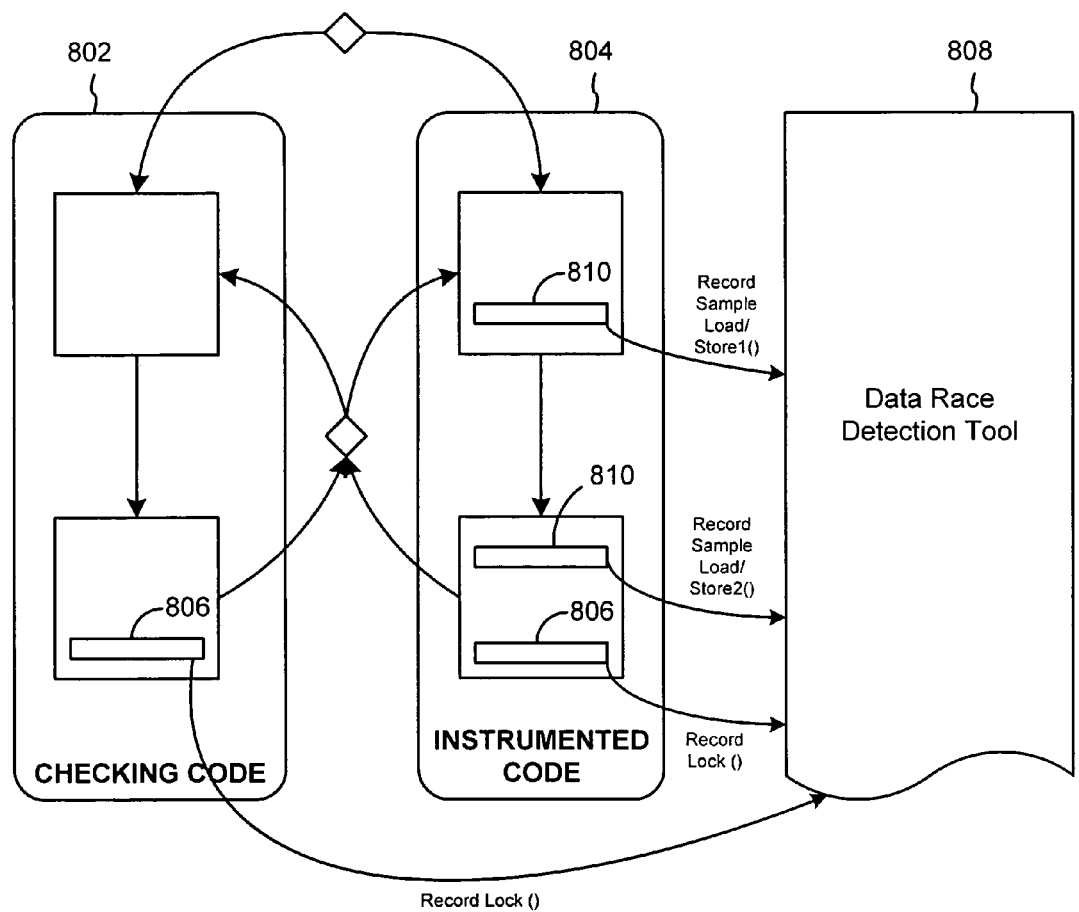
FIG. 8 is a block diagram of a data race detection tool implemented using the frame work of FIG. 2.

FIG. 8 is a block diagram of a data race detection tool implemented using the frame work of FIG. 2. FIG. 8 shows checking code 802 and instrumented code 804. Checking code 802 includes instrumentation code 806 for providing information regarding lock acquisitions and releases to data race detection tool 808. Instrumentation code 806 includes instrumentation points where code can be inserted in order to provide event information. In this embodiment, the instrumentation points contain code 810 that provides sampled sets of heap accesses to data race detection tool 808.

Figure 9:
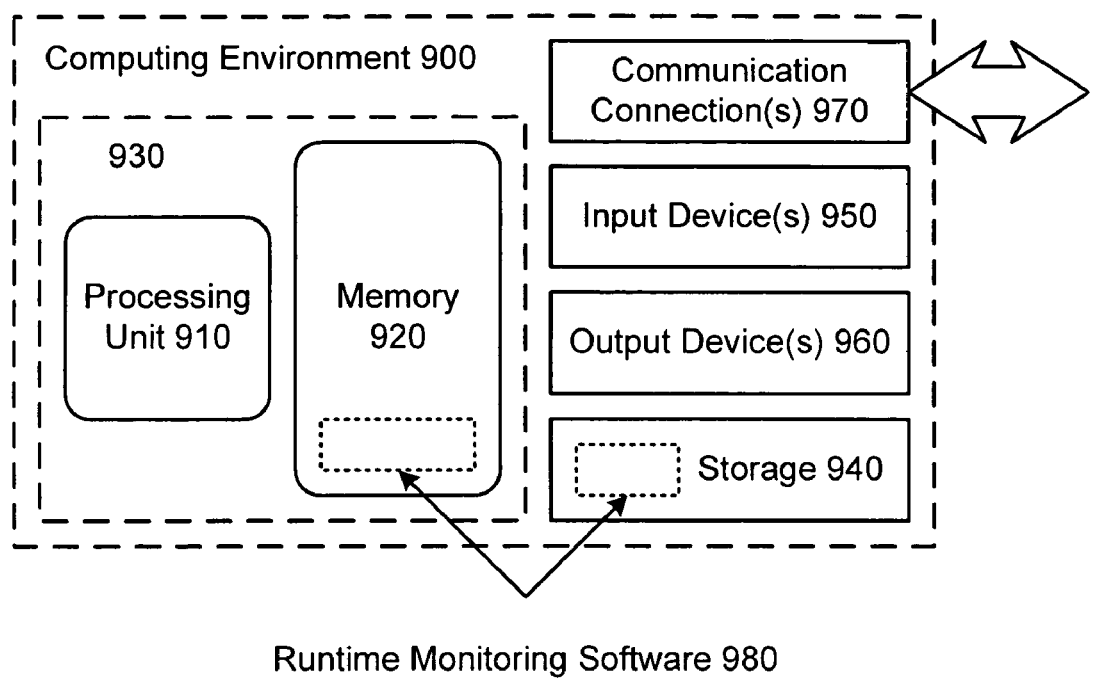
FIG. 9 illustrates a generalized example of a suitable computing environment 600 in which the described techniques can be implemented.

FIG. 9 illustrates a generalized example of a suitable computing environment 900 in which the described techniques can be implemented. The computing environment 900 is not intended to suggest any limitation as to scope of use or functionality of the invention, as the present invention may be implemented in diverse general-purpose or special-purpose computing environments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. The memory 920 stores software 980 implementing the software described herein.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. The storage 940 stores instructions for adaptive instrumentation runtime monitoring and analysis software 980. Those skilled in the art will realize that storage devices utilized to store program instructions can be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The input device(s) 950 may be a touch input device such as a keyboard, mouse, pen, or trackball, a voice input device, a scanning device, or another device that provides input to the computing environment 900. For audio, the input device(s) 950 may be a sound card or similar device that accepts audio input in analog or digital form, or a CD-ROM reader that provides audio samples to the computing environment. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The adaptive instrumentation runtime monitoring and analysis techniques herein can be described in the general context of computer-readable media. Computer-readable media are any available media that can be accessed within a computing environment. By way of example, and not limitation, with the computing environment 900, computer-readable media include memory 920, storage 940, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

Although the specific embodiments described herein referred to detection of memory leaks and data races, the invention is not so limited. For instance, a tool can be created using the disclosed techniques for checking invariance in code by simply altering the disclosed method to check array accesses versus array bounds in the instrumented versions of the original code.

We claim:

1. A method of testing for memory leaks during an execution of a program, the method comprising:
   providing the program to be executed;
   providing a duplicate version of at least some procedures in the program with instrumentation for capturing a temporal sequence of data references by the program, the duplicate version of at least some procedures in the program being duplicate instrumented code;
   inserting check code at locations of at least some dispatch placement points;
   causing execution to proceed in the program upon executing the check code when in a checking phase;
   causing execution to proceed in the duplicate instrumented code upon executing the check code when in a profiling phase;
   switching from the checking phase to the profiling phase at a sampling rate adapted in inverse proportion to an execution frequency of a respective code path;
   tracking a staleness of an object of the program, the staleness of the object of the program based on at least the temporal sequence of data references, wherein the temporal sequence of data references includes at least one of (a) at least one access to the object of the program during the execution of the check code in the profiling phase or (b) the allocation time of the object of the program;

determining a memory leak occurs when a staleness predicate is satisfied, the staleness predicate based on at least the staleness of the object of the program; and running the program.

2. The method of testing for memory leaks during the execution of the program of claim 1, the method further comprising:

ranking the memory leaks; and producing a leak report.

3. The method of testing for memory leaks during the execution of the program of claim 2, in which the ranking the memory leaks is based on at least number of objects leaked, bytes leaked, and drag of leaked objects, wherein the drag of a leaked object is a space-time product of the number of bytes leaked by the object multiplied by the time the leaked object used up space.

4. The method of testing for memory leaks during the execution of the program of claim 2, in which the ranking the memory leaks is at least partly based upon a drag of a leaked object, wherein the drag of the leaked object is a space-time product of the number of bytes leaked by the object multiplied by the time the leaked object used up space.

5. The method of testing for memory leaks during the execution of the program of claim 2, the dispatch check placement points including at least one of procedure entries of the program and loop back edges of the program.

6. The method of testing for memory leaks during the execution of a program of claim 1, wherein the temporal sequence of data references includes zero accesses to the object of the program during the execution of the check code in the profiling phase.

7. The method of testing for memory leaks during the execution of a program of claim 1, wherein the temporal sequence of data references includes at least one access to the object of the program during the execution of the check code in the profiling phase.

8. A low-overhead method of detecting memory leaks, the method comprising:

tracing an execution of a program by switching between a checking code and an instrumented code, the checking code being a duplicate version of the program modified to contain check code at at least some dispatch check placement points, the instrumented code being a duplicate version of at least some procedures of the program, modified to contain instrumentation for capturing a temporal sequence of data references by the program;

causing execution to proceed in the checking code upon executing the check code when in a checking phase;

causing execution to proceed in the instrumented code upon executing the check code when in a profiling phase;

switching from the checking phase to the profiling phase at a sampling rate adapted in inverse proportion to an execution frequency of a respective code path;

tracking staleness of the object of the program, the staleness of the object of the program based on at least the temporal sequence of data references, wherein the temporal sequence of data references includes at least one of (a) at least one access to the object of the program during the execution of the check code in the profiling phase or (b) the allocation time of the object of the program; and determining a memory leak occurs when a staleness predicate is satisfied, the staleness predicate based on at least the staleness of the object of the program.

9. The method of detecting memory leaks of claim 8, the dispatch check placement points including at least one of procedure entries of the program and loop back edges of the program.

10. The method of detecting memory leaks of claim 8, in which the program is in operation while tracking the staleness of the object.

11. The method of detecting memory leaks of claim 8, in which a memory leak occurs when the staleness of the object of the program is further based on at least a predefined length of time.

12. The method of detecting memory leaks of claim 8, in which a memory leak occurs when the staleness of the object of the program is further based on at least a length of time since the object was accessed.

13. The method of detecting memory leaks of claim 8, in which a memory leak occurs when the staleness of the object of the program is based on at least a length of time representing an activity interval between a first access to the object and a subsequent access to the object.

14. The method of detecting memory leaks of claim 8, in which a memory leak occurs when the staleness of the object of the program is based on at least a length of time between the first access of the object and the last access of the object.

15. The low-overhead method of detecting memory leaks of claim 8, wherein the temporal sequence of data references includes at least one access to the object of the program during the execution of the check code in the profiling phase.

16. A method for detection of memory leaks, the method comprising:

providing a duplicate version of at least some procedures in the program with instrumentation, the instrumentation including instrumentation for capturing a temporal sequence of data references by the program;

inserting check code at locations of at least some dispatch placement points;

alternately tracking a number of iterations of the check code executed in a checking phase and a profiling phase up to respective checking and profiling count parameters, wherein the profiling count parameter is more than one, and the duplicate version of the at least some procedures in the program with instrumentation are executed during the profiling phase, and a non-instrumented version of the program's procedures are executed during the checking phase;

causing execution to proceed in the non-instrumented version of the program's procedures upon executing the check code when in the checking phase;

causing execution to proceed in the duplicate version of the at least some procedures in the program with instrumentation upon executing the check code when in the profiling phase;

switching between checking and profiling phases upon the tracked number of iterations of the check code reaching the respective count parameter of the respective phase;

increasing the checking count parameter corresponding to a respective code path in proportion to an execution frequency of the respective code path;

tracking a staleness of an object of the program, the staleness of the object of the program based on at least the temporal sequence of data references, wherein the temporal sequence of data references includes at least one of (a) at least one access to the object of the program during the execution of the check code in the profiling phase or (b) the allocation time of the object of the program; and determining a memory leak occurs when a staleness predicate is satisfied, the staleness predicate based on at least the staleness of the object of the program.

17. The method for detection of memory leaks of claim 16, the instrumentation including instrumentation for providing sampled sets of heap accesses to a memory leak detection tool.

18. The method for detection of memory leaks of claim 16, the method further comprising:

ranking the memory leaks, the ranking the memory leaks based at least in part upon a drag of a leaked object, wherein the drag of the leaked object is a space-time product of the number of bytes leaked by the object multiplied by the time the leaked object used up space; and producing a memory leak report.

19. The method for detection of memory leaks of claim 16, the dispatch check placement points including at least one of procedure entries of the program and loop back edges of the program.

20. The method for detection of memory leaks of claim 16, wherein the temporal sequence of data references includes at least one access to the object of the program during the execution of the check code in the profiling phase.

* * * * *